United States Patent [19]
Psenka

[11] 3,795,958
[45] Mar. 12, 1974

[54] GEAR TOOTH BROACH
[75] Inventor: Joseph A. Psenka, Bloomfield Hills, Mich.
[73] Assignee: Lear Siegler, Inc., Santa Monica, Calif.
[22] Filed: Aug. 1, 1972
[21] Appl. No.: 276,905

[52] U.S. Cl. ................................................ 29/95.1
[51] Int. Cl. ............................................. B26d 1/04
[58] Field of Search ...................................... 29/95.1

[56] References Cited
UNITED STATES PATENTS
3,178,800  4/1965  Psenka ................................ 29/95.1
2,898,670  8/1959  Pernack ............................... 29/95.1

Primary Examiner—Harrison L. Hinson
Attorney, Agent, or Firm—Whittemore, Hulbert & Belknap

[57] ABSTRACT

A gear tooth broach for helical gears has the last few finishing teeth, which are adapted to engage in the work piece simultaneously, having one side thereof modified to prevent cutting and to serve as a guide to prevent drift of the broach which would produce a build-up referred to in the art as a "dog leg" lead.

11 Claims, 11 Drawing Figures

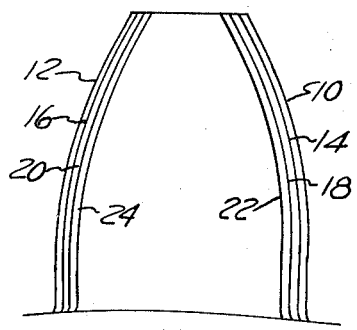
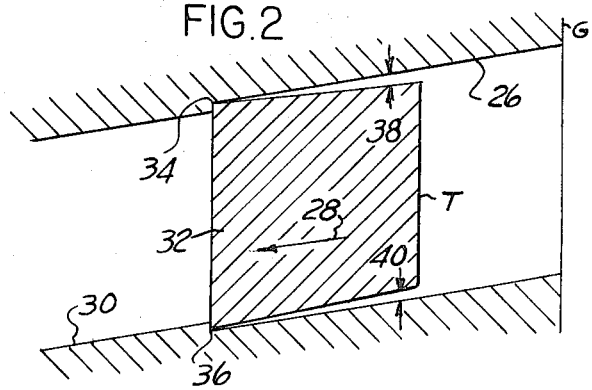
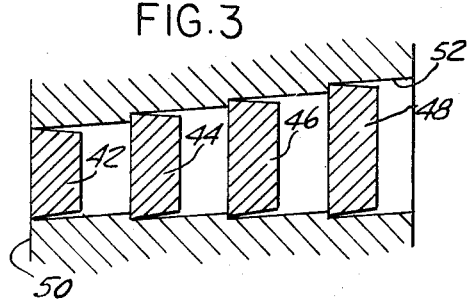
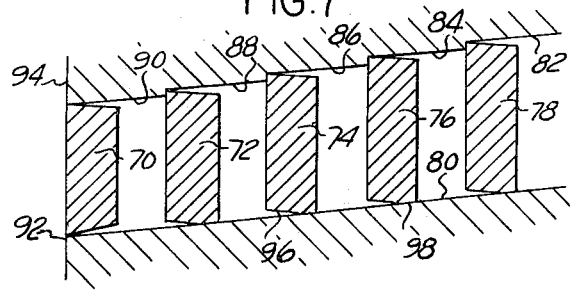
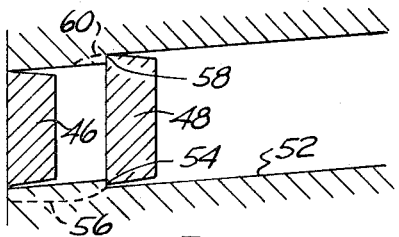
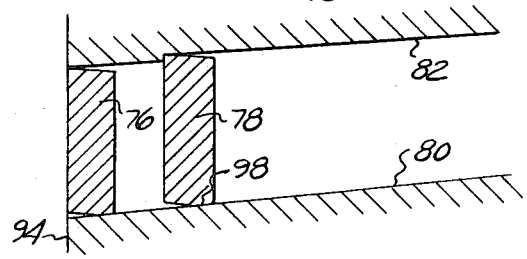
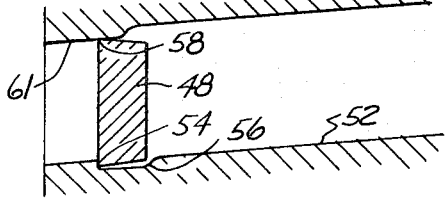
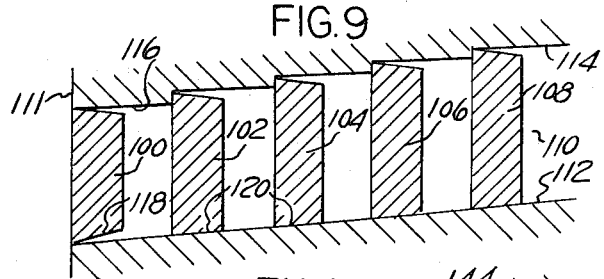
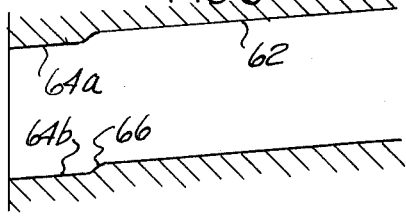
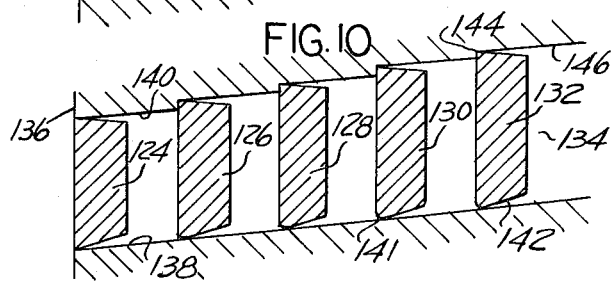

GEAR TOOTH BROACH

BRIEF SUMMARY OF THE INVENTION

The present invention relates to broaching of helical toothed parts having helically extending teeth. The parts are usually gears but may be splines.

The invention is applicable to the finishing section of a broach or broach assembly for broaching internal or external gears. In a preferred application of the invention it is applied to a finishing shell rotatably supported on the trailing end of a roughing broach, in which the teeth of the finishing shell include a series of teeth of substantially full height and increasing width to perform an operation known as full form finishing. A broach of this type is illustrated and described in my prior U.S. Pat. No. 2,987,801.

In general, broaching of gears or similar toothed members is an operation in which the cutting teeth of the broach constitute the guiding or locating means which maintains the broach and work piece in proper relation during the cutting operation. Where a broach is employed to cut spur gears whose teeth are parallel to the axis of the gear and in which case the teeth of the broach are arranged in series in longitudinal alignment parallel to the axis of the broach, there is ordinarily little or no tendency for a relative drift either laterally or circumferentially, to take place between the gear and the broach. Any tendency for such drift is ordinarily ineffective while a plurality of rings or circular arrays of broach teeth are simultaneously in contact with the work.

However, as the final few teeth of the broach come into action, there is a reduction in guiding action as each ring of broach teeth passes beyond the end of the work until finally, only a single row of teeth of the broach remain in cutting contact with the gear.

If, at this time there is a tendency for the relative drift between the broach and work to occur, the limited contact between the few remaining teeth and the previously broached surface of the work is insufficient to prevent the drift from taking place.

Where the broach is cutting helical teeth, the usual broach teeth have a front cutting face which has at one side thereof a cutting edge having an acute included angle while the cutting edge at the opposite side of the face of such teeth is an obtuse included angle.

It has been found that as the final few rings of the broach emerge from the broached hole, there is a tendency for the cutting edges of the teeth having the acute included angle to cut more deeply into the side of the tooth space of the work piece, and this results in circumferential or rotational drift of the work piece which leaves a corresponding build-up on the opposite side of the tooth space, or the side being cut by the obtuse included angle cutting edge of the tooth.

This deviation from the theoretically correct form of the tooth is readily detectable by conventional lead checking apparatus and is referred to in the industry as a "dog leg." The presence of a build-up due to material which the obtuse included angle corner of the broach tooth fails to remove, is particularly objectionable.

In accordance with the present invention, the last few teeth of the broach are modified so that no cutting occurs at the side of the broach teeth normally having the acute included angle cutting edge.

The foregoing may be accomplished by simply not providing the acute angle side of the last few teeth of the broach with back-off, which will prevent conventional cutting, although some minor cutting due to face sharpening burrs may occur.

Alternatively, the normally acute included angle cutting edge may be dulled as by heavy vapor blasting so that in effect it becomes a non-cutting corner.

Alternatively, the side of the last few teeth at the front acute included angle corner may be dubbed off or chamfered so as to eliminate cutting.

Another tooth modification at the acute included angle side of the last few broach teeth may be a relatively long inclined ramp leading to a point adjacent the trailing end of the tooth. This permits repeated resharpening or face grinding without requiring repeated modification of the tooth to preserve the non-cutting status at the side normally having the acute included angle cutting edge.

The foregoing modification may be applied to only the last few rings or circular arrays of cutting teeth, butt in no case will it be applied to a greater number of teeth than are adapted to engage simultaneously in the work.

BRIEF DESCRIPTION OF THE DRAWINGS

FIG. 1 is a diagrammatic view illustrating the succession of cuts adapted to be taken by the last few teeth of a full form finishing side shaving broach.

FIG. 2 is a diagrammatic view showing a single broached tooth in a tooth space.

FIG. 3 is a diagrammatic view illustrating the successive action of the last few teeth of a broach as they move through a helical tooth space in a work piece.

FIG. 4 is a diagrammatic view illustrating the condition which exists as the next to the last tooth moves out of the broached tooth space.

FIG. 5 is a diagrammatic view illustrating the condition existing as the final tooth of a longitudinal series moves out of the tooth space.

FIG. 6 is a diagrammatic view illustrating the presence of a dog leg in the tooth space.

FIG. 7 is a diagrammatic view illustrating a succession of teeth provided with relatively long ramps at the sides of the teeth normally having the acute included angle cutting edge.

FIG. 8 is a diagrammatic view illustrating the condition as the last two teeth of the broach shown in FIG. 6 move out of the tooth space.

FIG. 9 is a diagrammatic view illustrating the provision of teeth with no cutting clearance at the acute angle side.

FIG. 10 is a diagrammatic view illustrating a series of broach teeth having the acute angled corner dulled.

DETAILED DESCRIPTION

Figure 11:
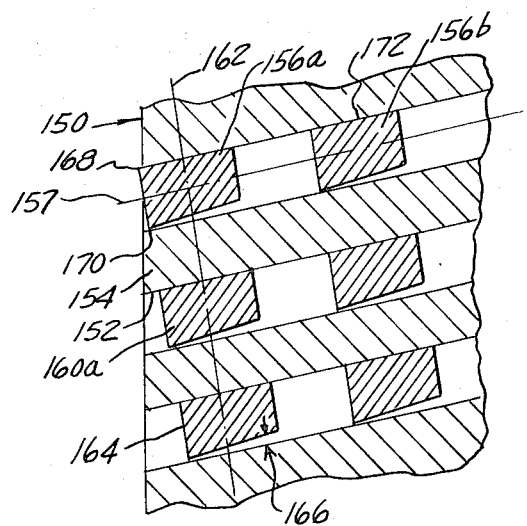
FIG. 11 is a diagrammatic view showing the invention applied to a double helical broach.

While the present invention is applicable to the cutting of internal gears by means of a conventional broach or the broaching of external gears by a pot broach, and while it is applicable to the finishing section of a solid broach or to a floating shell provided at the trailing end of a roughing broach, it may be assumed in the following description that reference is to a finishing shell provided with a multiplicity of rings or circular arrays of teeth extending around the shell and in which the teeth are arranged in longitudinally extending series or sets, which in the present case extend helically of the shell for the purpose of finishing helical teeth of the gear. Moreover, it will be understood that the following description is specifically directed to an operation in which the finishing shell is provided with a succession of teeth of progressively greater width, each of which is normally adapted to cut simultaneously at opposite sides for the full height of the tooth. These teeth perform an operation known as full form finishing.

Referring now to FIG. 1 there is diagrammatically illustrated a succession of cuts adapted to be taken by the teeth of a full form finishing, side shaving shell. The last tooth of the series cuts simultaneously along the lines 10 and 12 and follow a preceding tooth which cuts along the lines 14 and 16 and thus removes the material between the lines 10,14 and between the lines 12,16. Similarly, the third tooth from the end cuts along the lines 18 and 20, and the fourth tooth from the end cuts along the lines 22 and 24.

It will of course be understood that FIG. 1 is merely diagrammatic and does not suggest that the full form finishing operation is performed by four teeth. Actually, the number of full form finishing teeth in each series may be ten or more in number.

In order to define the terms used in the following description, a single broach tooth is diagrammatically illustrated in FIG. 2 as T and is shown as moving along a toothed space of a gear G having side walls 26 which have been cut as a result of relative motion between the tooth T and the gear G corresponding to motion of the tooth T in the direction of the arrow 28. It will be understood that the surface of the tooth space preceding the tooth T, as indicated at 30, was cut by the preceding tooth (not shown) and that the tooth T is performing a cutting operation which removes material from the tooth space to produce the surfaces 26. In this Figure it will be observed that the tooth T is illustrated as removing substantially equal amounts of material at both sides of the tooth space. The tooth T has a front face 32 and side cutting corners, the corner 34 being a cutting edge having an obtuse included angle, while the corner 36 forms a cutting edge having an acute included angle as illustrated.

As usual, side cutting clearance is provided by having the sides of the tooth T taper rearwardly from the direction of movement, the side cutting clearance or back-off angle being the angle designated at 38 at the obtuse corner side of the tooth, and at 40 at the acute corner side of the tooth.

Referring now to FIG. 3 there is shown in greatly exaggerated proportions a series of cutting teeth 42, 44, 46 and 48 moving in a work piece 50 and forming a tooth space, the portion 52 of which represents a final tooth space as finished by the final cutting tooth 48. As illustrated in this Figure the leading tooth 42 is shown as just about to leave the tooth space. Accordingly, at this moment all four of the teeth are both performing a cutting operation and assisting in guiding the relative movement between the broach and gear. However, since the tooth 42 leaves the tooth space the guiding action will then be performed only by the teeth 44, 46 and 48. While this may be sufficient to maintain a true lead at both sides of the tooth space, at some point the guiding action becomes insufficient and there is a tendency for the broach to drift circumferentially. This tendency to drift is toward the acute included angle corner of the tooth, causing this acute included angle cutting edge to dig in and the resulting drift will cause a build-up due to material left at the opposite side of the tooth space. This condition is illustrated in FIG. 4 where it will be observed that the acute included angle corner, here designated 54, is about to dig into the projected surface 52 along the dotted line indicated at 56, and the resultant circumferential drift of the broach will have caused the obtuse included angle corner 58 to move along the dotted line indicated at 60 and thus, to leave excess material.

This condition is further illustrated in FIG. 5 where the final tooth 48 has dug into the tooth surface as indicated at 56, and where the obtuse corner 58 of the tooth has moved laterally to leave excess material, a further portion of which is illustrated ahead of the tooth at 61.

While reference is made to the obtuse and acute corners of the broach teeth, the actual included angles of the cutting edges are determined by the helix angle and by the back-off angle at the sides of the teeth, being in effect the helix angle plus or minus the back-off angle.

Referring now to FIG. 6 there is shown the tooth space having a dog leg or lead error illustrated by the offset between the side portions 62 of the tooth space and the portions 64a and 64b thereof, this offset occurring at the zone designated 66 in the Figure. While the fall-off indicated at 64b is not particularly harmful, the excess material present on the side of the tooth space at 64a is highly detrimental and results in unacceptable gears.

Referring now to FIG. 7 there is illustrated a modification of broach in which the final unmodified tooth is indicated at 70 and the four modified teeth 72, 74, 76 and 78 are illustrated as located in the incompletely cut tooth space having a side wall 80 and an opposite side wall composed of stepped portions 82, 84, 86, 88 and 90. The acute angle corner 92 of the tooth 70 has just cut the surface 80 and is just leaving the gear 94. The teeth 72, 74, 76 and 78 are modified on their acute corners by the provision of longitudinally elongated ramps 96, leaving guiding surface portions 98 extending from the rear of the tooth forwardly to merge with the inclined ramp surface 96. Inasmuch as the guiding surface 98 prevents the corner formed by the intersection between the ramp surface 96 and the front face of the tooth from engaging in the side of the tooth space, no cutting can occur at the acute corners of the teeth and accordingly, all of the teeth 72, 74, 76 and 78 are guided along the surface 80 so that the obtuse corners of these teeth cut progressively with the result that the final cutting tooth 78 will extend the surface 82 as a fully cut true lead surface all the way to the exit side of the gear.

Referring now to FIG. 8 there is illustrated the condition which will exist when the next to the last tooth 76 is just about to leave the gear 94 and has extended the tooth surface 82 substantially through the gear as indicated. The final cutting tooth 78 will be maintained in true cutting condition by the guide surface 98 until its obtuse cutting corner extends the surface 82 completely to the left hand end of the gear as illustrated in the Figure.

Referring now to FIG. 9 there is illustrated an arrangement of teeth 100, 102, 104, 106 and 108 constituting the last five teeth of a broach operating in a tooth space indicated generally at 110 of a gear 111 and having a side wall 112 and an opposite incompletely cut side wall which when completed will be constituted by an extension of the partially cut tooth space surface 114.

The tooth 100 is the last unmodified cutting tooth of the series and has cut one side wall of the tooth to provide the surface 112 as illustrated and has cut the opposite side to provide the surface 116 which will be successively cut by the teeth 102, 104, 106 and 108.

In this embodiment of the invention the acute corners of the teeth are rendered non-cutting by the expedient of not providing the back-off or cutting clearance such as is provided on the last unmodified tooth by backing off the side 118 as shown. Since no back-off is provided, the normally acute corners of the teeth 102, 104, 106 and 108 are non-cutting, and the unrelieved sides 120 of the teeth constitute guide surfaces which will cooperate with the tooth space surface 112 to cause the obtuse cutting corner of the tooth 108 to cut along the extension of the surface 114 completely to the exit side of the tooth space 110 in the gear 111.

Referring now to FIG. 10 there is illustrated a further embodiment of the invention in which the final five teeth of the broach are indicated at 124, 126, 128, 130 and 132, all operating in the tooth space 134 of a gear 136. The leading tooth 124 of the series has sharp cutting corners at both the obtuse and acute angle corner sides and will accordingly have cut the tooth space to provide the surfaces 138 and 140 therein. The acute corners of the teeth 126, 128, 130 and 132 are rendered non-cutting. These non-cutting corners are indicated at 141 in FIG. 10 as applied to teeth which have been backed off as indicated at 142. The invention however, may be applied by dulling, chamfering, or rounding off the normally acute corners at 141 without providing the back-off illustrated at 142.

With the arrangement illustrated the succession of teeth 126, 128, 130 and 132 will be guided along the finish tooth surface 138 with the result that the obtuse cutting corner 144 of the final tooth 132 will cut along the extension of the tooth surface 146 uniformly to the exit end of the tooth space 134 in the gear 136.

The invention as described in the foregoing is applied to helical tooth gear broaches in which the cutting teeth are disposed in a multiplicity of circular arrays and in which the teeth of each array are positioned such that there is helical alignment between a series of teeth adapted to move longitudinally along a helical groove or tooth space in the work.

A somewhat different arrangement of gear tooth broach is known in which the teeth, instead of being arranged in a multiplicity of circular arrays, are arranged in a helical path disposed to be intersected generally at right angles by a helix corresponding to the helix angle of the teeth to be cut. With this arrangement the front face of each tooth is generally perpendicular to the path of advance of the teeth along a helical tooth space, rather than perpendicular to the axis of the broach. Also, with this arrangement the cutting edges formed by the intersection between opposite sides of the teeth and the front face thereof have included angles of approximately 90°.

However, with this type of broach, a similar problem is presented due to the fact that the cutting edge at one side of each tooth comes out of the tooth space into clearance while the cutting edge at the opposite side remains within the tooth space. With this arrangement there is a tendency for the last cutting edge or the last few cutting edges remaining within the tooth space to drift circumferentially and to form a build-up or dog leg lead as previously described.

Referring now to FIG. 11 there is shown a development of a section of a work piece 150 having helical tooth spaces 152 intermediate helical teeth 154 which are cut by the broach. The broach has cutting teeth which are arranged in a double helical arrangement. The teeth 156a and 156b are disposed in a helix diagrammatically indicated by dot and dash line 157 and correspond to the helix angle of the gear being cut and accordingly, the tooth 156b follows along the tooth space 152 behind the tooth 156a. The tooth 160a is associated with the tooth 156a and other teeth helically aligned therewith along a helix indicated by the dot and dash line 162. The front faces 164 of the teeth 156a, 156b, 160a, are thus all generally perpendicular to the path of advance of these teeth along the tooth spaces 152. Throughout the major leading portion of the length of the broach, all of the teeth are provided at both sides thereof with cutting clearance as indicated at 166. However, adjacent the trailing end of the broach and applied to the last few teeth to engage in the tooth spaces 152, a modification is necessary. It will be observed that the cutting edges 168 which are spaced forwardly from the cutting edges 170 at the opposite sides of the teeth, move into clearance ahead of the cutting edges 170. If the sides of the teeth having the leading cutting edges 168 were relieved as conventionally, then the cutting edges 170 would be permitted to drift circumferentially away from the tooth surfaces which they are cutting.

Accordingly, the invention as applied to the double helical broach illustrated in FIG. 11 is to modify the sides of the last few teeth having the cutting edges located forwardly of the cutting edges at the opposite side thereof, so as to constitute guiding surfaces and to eliminate cutting. This can be done as suggested in FIG. 11 by simply not providing cutting clearance. Accordingly, the sides of the teeth as indicated at 172 will thus constitute guiding surfaces which will be effective to cause the trailing cutting edges 170 to cut along the true lead completely to the end of the tooth spaces 152.

It is emphasized that the present modification is applied only to a very limited number of teeth at the trailing end of the broach and that this number of teeth in no case extends the number of teeth adapted to be simultaneously in contact with the work. In many cases the specific modification disclosed herein is applied to less than the number of teeth which simultaneously engage the work and in some cases, the modification will produce acceptable improved results if applied only to the last tooth or the last two teeth in series.

Accordingly, all of the teeth preceding the specially modified teeth are adapted to cut on both sides and accordingly, to produce the fine finish and accuracy in combination with efficiency of stock removal characteristic of full form finishing provided by side shaving.

What I claim as my invention is:

1. A helical broach for broaching helical teeth comprising an elongated device having a multiplicity of longitudinally helically extending series of teeth stepped to progressively cut a corresponding multiplicity of helically extending tooth spaces, all of said teeth except the last few having front faces and side surfaces intersecting the front faces to form side cutting edges, all of said teeth except the last few being of substantially full height and of progressively increasing width and provided with sharp relieved cutting edges at both sides to perform an operation known as full form finishing in which each tooth removes chips at opposite sides thereof for the full height of the tooth and of substantially equal thickness, only the last few teeth of the broach, not exceeding in number the maximum number of teeth in contact with a work piece for which the broach is designed, being modified to have one side thereof non-cutting and operable only as guides.

2. A broach as defined in claim 1 in which the front faces of said teeth are generally perpendicular to the axis of said broach, so as to form acute and obtuse included angle cutting edges at opposite sides thereof, and in which the modification of the last few teeth is to render the acute included angle sides thereof non-cutting and operable only as guides.

3. A broach as defined in claim 1 in which the teeth of said series are of a height corresponding substantially to full depth of the tooth space, so that each tooth, except for the few modified teeth at the trailing end of the broach, are adapted to shave the work gear teeth throughout its full height.

4. A broach as defined in claim 3 in which said multiplicity of teeth are formed on the exterior of a tubular shell.

5. A broach as defined in claim 3 in which the modified teeth have no back-off at the side having the acute included angle corner.

6. A broach as defined in claim 3 in which the modified teeth have the corner defined by the intersection between the side of the teeth and the front face thereof at the normally acute angled side being dubbed off or dulled.

7. A broach as defined in claim 3, in which each of the modified teeth has one side thereof inclined rearwardly and outwardly to a point adjacent to but spaced slightly forwardly of the rear end of the teeth to provide guide surfaces on the teeth near the rear end and to provide clearance between the front corner and the side of the tooth space.

8. A broach as defined in claim 4 in which the modified teeth have no back-off at the side having the acute included angle corner.

9. A broach as defined in claim 4 in which the modified teeth have the corner defined by the intersection between the side of the teeth and the front face thereof at the normally acute angled side being dubbed off or dulled.

10. A broach as defined in claim 4, the side thereof inclined rearwardly and outwardly to a point adjacent to but spaced slightly forwardly of the rear end of the teeth to provide guide surfaces on the teeth near the rear end and to provide clearance between the front corner and the side of the tooth space.

11. A broach as defined in claim 1 in which the teeth are also arranged in one or more helical paths around the broach, in which the front face of said teeth are generally perpendicular to said helical paths, and in which the modification of the last few teeth is to form the sides thereof whose cutting edges are located axially ahead of the other sides thereof as guide surfaces to ensure cutting a true lead by the cutting edges at said other sides.

* * * * *